United States Patent
Logsdon, Sr.

(10) Patent No.: US 10,583,849 B1
(45) Date of Patent: Mar. 10, 2020

(54) TANK LIFTER

(71) Applicant: MASTER PLUMBING CORPORATION, San Diego, CA (US)

(72) Inventor: Michael S. Logsdon, Sr., San Diego, CA (US)

(73) Assignee: MASTER PLUMBING CORPORATION, San Diego, CA (US)

( * ) Notice: Subject to any disclaimer, the term of this patent is extended or adjusted under 35 U.S.C. 154(b) by 0 days.

(21) Appl. No.: 16/142,971

(22) Filed: Sep. 26, 2018

(51) Int. Cl.
*B62B 1/16* (2006.01)
*B62B 5/00* (2006.01)
*B62B 1/06* (2006.01)

(52) U.S. Cl.
CPC .............. *B62B 1/16* (2013.01); *B62B 1/06* (2013.01); *B62B 5/0033* (2013.01)

(58) Field of Classification Search
CPC .... B62B 1/16; B62B 1/00; B62B 1/24; B62B 1/14; B62B 1/06; B62B 1/10; B62B 1/264; B62B 5/0033; B62B 5/0046; B62B 3/104
See application file for complete search history.

(56) References Cited

U.S. PATENT DOCUMENTS

| | | | | |
|---|---|---|---|---|
| 2,598,489 A * | 5/1952 | Bayer | ................ | B62B 1/14 414/467 |
| 3,907,138 A * | 9/1975 | Rhodes | ................ | B62B 1/14 414/448 |
| 5,489,183 A * | 2/1996 | Malden | ................ | B62B 1/264 280/47.28 |
| 6,530,740 B2 * | 3/2003 | Kim | ................ | B62B 1/002 180/251 |
| 7,914,017 B2 * | 3/2011 | Setzer, Sr. | ................ | B62B 1/10 280/47.17 |
| 9,120,657 B1 * | 9/2015 | Turner | ................ | B62B 1/10 |
| 9,242,662 B2 * | 1/2016 | Scott | ................ | B62B 1/16 |
| 10,173,704 B2 * | 1/2019 | Jones | ................ | B62B 1/14 |
| 10,214,228 B2 * | 2/2019 | Benton | ................ | B62B 1/14 |
| 2002/0114689 A1 * | 8/2002 | McGill | ................ | B62B 3/008 414/634 |
| 2005/0110232 A1 * | 5/2005 | DiBenedetto | ................ | B62B 1/14 280/47.29 |
| 2006/0055134 A1 * | 3/2006 | McLoughlin | ................ | B62B 1/10 280/47.28 |
| 2008/0136131 A1 * | 6/2008 | Sorg | ................ | B62B 1/14 280/47.18 |

(Continued)

*Primary Examiner* — Kaitlin S Joerger
(74) *Attorney, Agent, or Firm* — Nydegger & Associates

(57) ABSTRACT

A motorized apparatus is provided to lift, tilt and transport heavy tank-like objects such as water heaters. Structurally, the apparatus includes a hitching assembly which can be engaged with an elongated tank to hold it on the apparatus. A guide rail, which is mounted for rotation around a pivot point on a chassis of the apparatus, is also engaged with the hitching assembly. Screw-drives, which are engaged between the guide rail and the hitching assembly, are activated to move the hitching assembly in translation on the guide rail. Also, a screw-drive, which is engaged between the chassis and the guide rail, is activated to rotate the hitching assembly and tank together around the pivot point on the chassis. Further, drive wheels on the apparatus can be selectively activated to transport the entire apparatus.

20 Claims, 3 Drawing Sheets

(56) References Cited

U.S. PATENT DOCUMENTS

| | | | | |
|---|---|---|---|---|
| 2009/0014979 | A1* | 1/2009 | Snook | B62B 1/14 |
| | | | | 280/200 |
| 2010/0021275 | A1* | 1/2010 | Ratermann | B62B 1/14 |
| | | | | 414/454 |
| 2010/0176574 | A1* | 7/2010 | Pollice | B62B 3/02 |
| | | | | 280/401 |
| 2010/0327544 | A1* | 12/2010 | Pebworth | B62B 1/14 |
| | | | | 280/6.151 |
| 2011/0276181 | A1* | 11/2011 | Lamb | B62B 1/14 |
| | | | | 700/275 |
| 2014/0001721 | A1* | 1/2014 | Benko | B62B 5/025 |
| | | | | 280/47.28 |
| 2018/0170417 | A1* | 6/2018 | Casey | B62B 5/0073 |
| 2018/0273071 | A1* | 9/2018 | Henninger | B62B 1/264 |
| 2018/0354539 | A1* | 12/2018 | Casey | B62B 5/0073 |
| 2019/0047601 | A1* | 2/2019 | Murphy | B62B 1/14 |

* cited by examiner

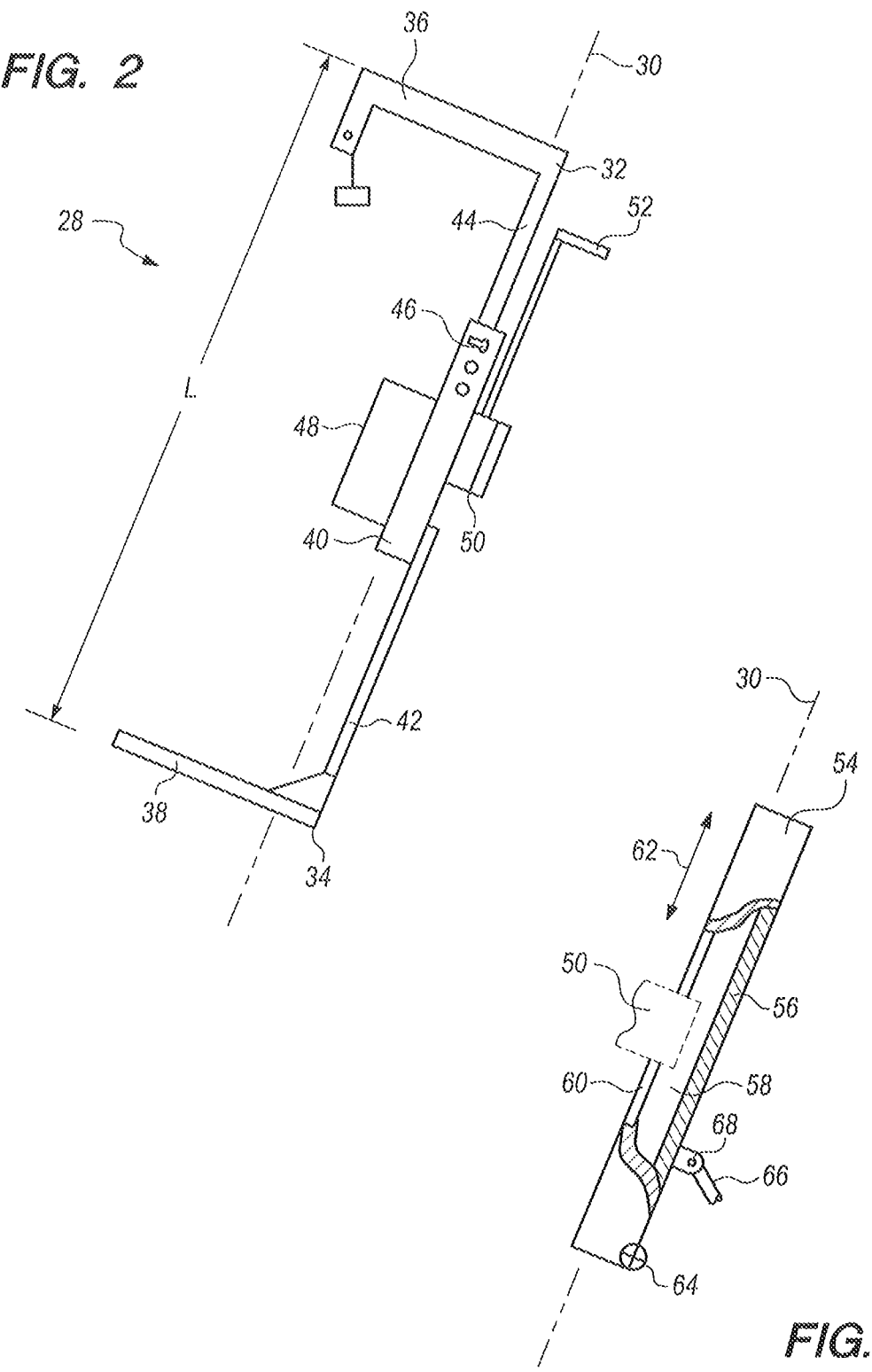

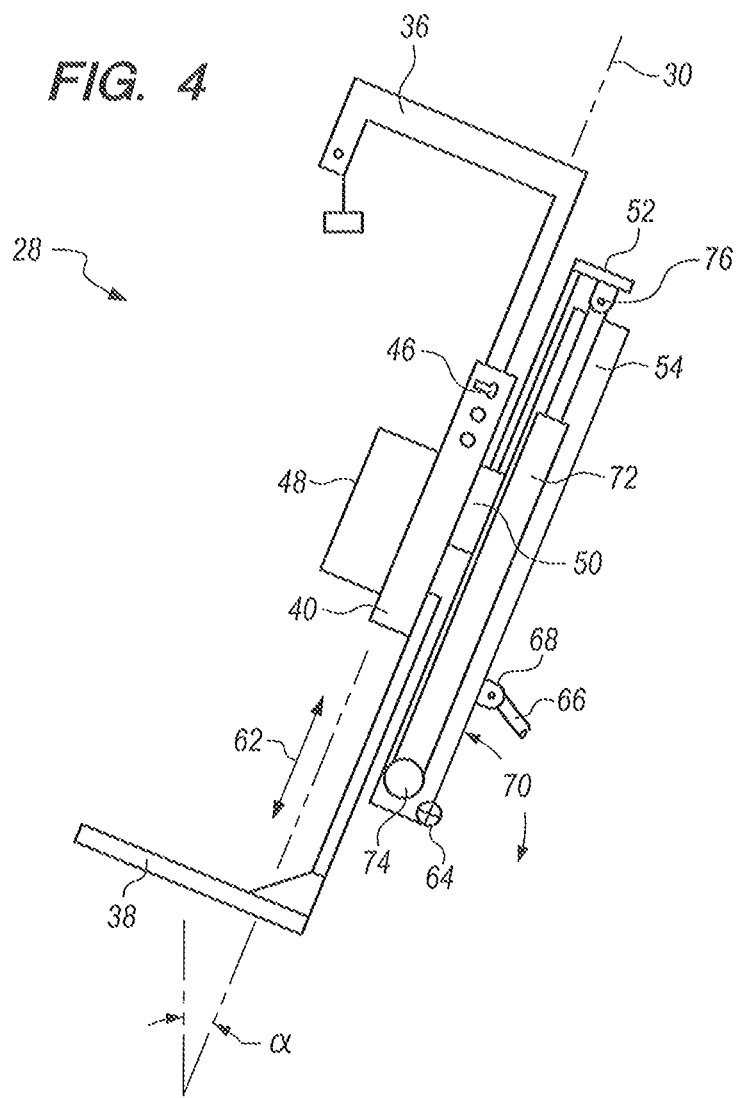

TANK LIFTER

FIELD OF THE INVENTION

The present invention pertains generally to motorized devices and apparatuses for transporting heavy objects. More particularly, the present invention pertains to motorized devices and apparatuses for transporting elongated liquid tanks over relatively short distances (e.g. between a home and a service truck). The present invention is particularly, but not exclusively, useful as a motorized apparatus for mechanically lifting, tilting and transporting water heaters.

BACKGROUND OF THE INVENTION

Moving heavy objects over relatively short distances may sometimes be necessary, but it is almost always difficult. As a consequence, several devices have been developed for the specific purpose of transporting particularly heavy objects over short distances (e.g. hand trucks and dollies). Still, it is often the case that a heavy object must be manhandled into position onto and off the transport device.

The most problematic aspect for the task of preparing a heavy object for short distance transport is the need to properly position it on the transport device. Invariably, this requires somehow lifting and positioning the object into a secure and stable orientation on the transport device. The difficulty in doing this, however, is easily aggravated when the weight of the object is substantial. Indeed, without mechanical assistance, the lifting and positioning of a heavy object may require the employment of several individuals.

With the above in mind, it is an object of the present invention to provide a motorized apparatus for mechanically lifting and tilting an elongated cylindrical-shaped tank (e.g. a water heater) into position on the apparatus for short distance transport. Another object of the present invention is to provide a motorized apparatus for moving an elongated cylindrical-shaped tank, wherein the apparatus can be mechanically adjusted to conform it for engagement with differently sized tanks to ensure a secure and stabilized transport of a particular tank. Still another object of the present invention is to provide a motorized apparatus for mechanically lifting and tilting an elongated cylindrical-shaped tank into position on the apparatus for short distance transport, wherein the apparatus is easy to use, is relatively simple to manufacture, and is comparatively cost effective.

SUMMARY OF THE INVENTION

In accordance with the present invention, a motorized apparatus is provided for lifting, tilting and transporting an elongated, cylindrical-shaped tank (e.g. a water heater). For purposes of disclosure, the tank defines a longitudinal axis and it may be either empty or full of water. In overview, as intended for the present invention, other than fastening the tank onto the apparatus, there is no need for an operator to manhandle the tank.

Structurally, the apparatus of the present invention includes a chassis. It also includes an elongated guide rail which is mounted on the chassis for rotation around a pivot point on the chassis. Further, the apparatus has a hitching assembly that is engaged with the guide rail. As envisioned for the present invention, the tank is to be fastened to the hitching assembly that is positioned on the guide rail. Thus, in combination, the tank and hitching assembly are held together on the guide rail.

In detail, the hitching assembly includes an elongated hitching bar that defines an axis and has an upper end and a lower end. Operationally, the hitching bar is positioned on the guide rail for translational movements in directions back and forth along the axis of the hitching bar. It is also positioned for rotational movements with the guide rail around the pivot point on the chassis. Specifically, this rotation will be back and forth from a vertical orientation through an angle $\alpha$, wherein the angle $\alpha$ is preferably in a range between 0° and 50°.

In addition to the hitching bar, the hitching assembly includes a foot that is affixed to the lower end of the hitching bar, and it has a cradle that is located between the upper and lower ends of the hitching bar. Together, the foot and the cradle act to support the tank on the hitching bar when the tank rests on the hitching bar and against the foot. Also, a buckle is attached to the upper end of the hitching bar for engagement with the tank, and a belt is connected with the cradle where it can be strapped over the tank to secure and stabilize the tank against the hitching bar.

To help conform the hitching assembly to the tank, the length of the hitching bar can be adjusted. Specifically, for this purpose, a locking pin can be used to adjust the length of the telescoping hitching bar. Thus, a specific distance L can thereby be established between the buckle at the upper end of the hitching bar and the foot at the lower end of the hitching bar, as desired.

A pair of lifting screw-drives which straddle the hitching bar are provided as a means for moving the hitching assembly together with the tank in translational movements on the guide rail. To do this, each lifting screw-drive has a first end fixedly mounted on the guide rail and a second end engaged with the hitching bar. Thus, an elongation or a shortening of the lifting screw-drives will move the hitching assembly/tank combination in translational movements on the guide rail.

A single, tilting screw-drive is provided as a means for tilting the guide rail around the pivot point on the chassis while the tank is hitched/fastened onto the hitching assembly. For this purpose, the tilting screw-drive has a first end which is pivotally mounted on the chassis. It also has a second end which is pivotally mounted on the guide rail at a location between the pivot point and the upper end of the hitching bar. Thus an elongation or a shortening of the tilting screw-drive will rotate the hitching assembly/tank combination in rotation through the angle $\alpha$ around the pivot point.

Transporting a tank with the apparatus of the present invention is possible with the operation of a carriage. In detail, the carriage supports the chassis of the apparatus and it includes a pair of front casters, a pair of rear casters, and a pair of drive wheels that are positioned between the front and rear pairs of casters. In combination, each drive wheel is respectively aligned between a front caster and a rear caster to support the carriage.

Overall control of the apparatus is provided by a control panel. Specifically, a lifting toggle switch on the control panel is electrically connected to the lifting screw-drives for operating the lifting screw-drives. Similarly, a tilting toggle switch is electrically connected to the tilting screw-drive for operating the tilting screw-drive, and a power switch is electrically connecting to the drive wheels on the carriage for operating the drive wheels. A motor is provided for powering the lifting screw-drives, the tilting screw-drive and the drive wheels.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is a side view of the hitching assembly for the present invention shown in a tilted orientation;

FIG. 3 is a side view of a guide rail for the present invention with a portion broken away for clarity; and FIG. 4 is a side view of the hitching assembly mounted on the guide rail for translational movements of the hitching assembly relative to the guide rail and for rotational movements of the hitching assembly together with the guide rail around a common pivot point on the chassis of the apparatus, shown with the hitching assembly in a tilted orientation and with representative screw-drives shown for moving the hitching assembly in translation and rotation.

DESCRIPTION OF THE PREFERRED EMBODIMENTS

Figure 1:
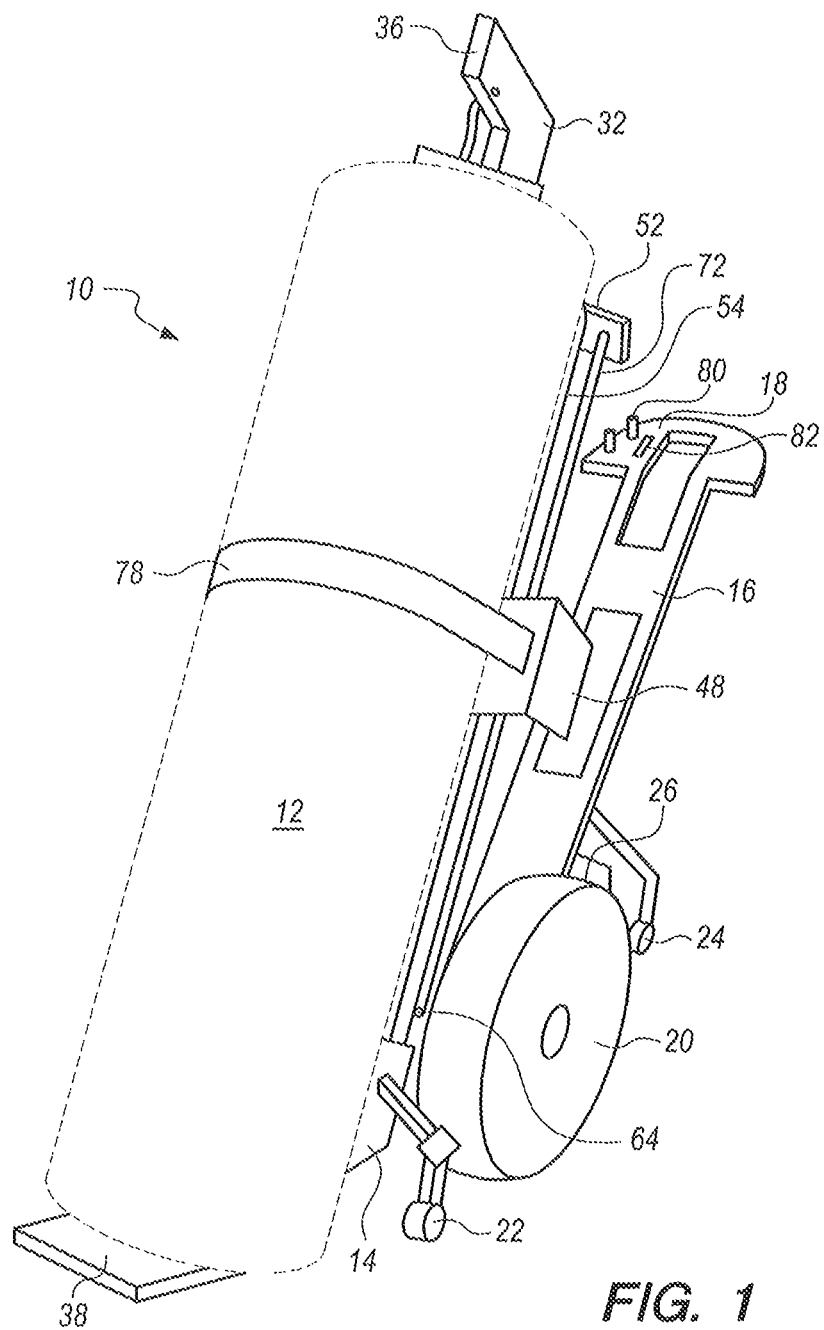
FIG. 1 is a perspective view of the apparatus for lifting and tilting a tank in accordance with the present invention.

Referring initially to FIG. 1, an apparatus for lifting and tilting an elongated, cylindrical-shaped tank is shown and is generally designated 10. For clarity in FIG. 1, a tank 12 is shown in phantom to distinguish it from the apparatus 10. As shown, the apparatus 10 includes a chassis 14 that incorporates a control bar 16. Also shown is a control panel 18 that is established on the control bar 16.

A carriage is provided as part of the chassis 14 for apparatus 10, and it is shown to include a drive wheel 20 that is aligned between a front caster 22 and a rear caster 24. Although only one drive wheel 20, one front caster 22 and one rear caster 24 are shown in FIG. 1, it is to be appreciated that a similar combination of drive wheel 20, front caster 22 and rear caster 24 (duplicates not shown) are on the other side of the chassis 14. For this carriage combination, a motor 26 is provided to power the drive wheels 20 for moving the apparatus 10.

Referring now to FIG. 2, a hitching bar for the apparatus 10 is shown and is generally designated 28. As shown, the hitching bar 28 is elongated, and it defines an axis 30 that extends between an upper end 32 and a lower end 34. Also, a buckle 36 is provided at the upper end 32 of the hitching bar 28, and a foot 38 is provided at the lower end 34 of the hitching bar 28. A central section 40 of the hitching bar 28 is located between the upper end 32 and the lower end 34 of the hitching bar 28. As shown, a lower section 42 of the hitching bar 28 is rigidly affixed to the central section 40, and an upper section 44 of the hitching bar 28 is telescopically engaged with the central section 40.

Still referring to FIG. 2, it is to be appreciated that a locking pin 46 is provided to interact between the central section 40 and the upper section 44 of the hitching bar 28. In particular, the locking pin 46 selectively interacts with the hitching bar 28 to allow for adjustments in the length of the hitching bar 28. Thus, with the locking pin 46, a fixed relationship can be created between the central section 40 and the upper section 44 to thereby establish a desired length L between the upper end 32 and the lower end 34 of the hitching bar 28. FIG. 2, also shows that a cradle 48 is formed on the central section 40, and that a connector 50 is mounted on the central section 40. Further, a push plate 52 is directly connected with the connector 50.

FIG. 3 shows a guide rail 54 that structurally interacts with both the hitching bar 28 and the chassis 14 of the apparatus 10. For its interaction with the hitching bar 28, a bracket 56 is mounted on the guide rail 54 to establish a hollow 58 inside the guide rail 54. A slot 60, which is formed on the guide rail 54, extends parallel to the axis 30 that is defined by the hitching bar 28 (note: the axis 30 is referred to here to disclose the cooperative relationship between the hitching bar 28 and the guide rail 54). Specifically, as shown in FIG. 3, a portion of the connector 50 of hitching bar 28 is inserted through the slot 60 and into the hollow 58 of the guide rail 54. In this combination, the connector 50 (i.e. hitching bar 28) can be moved back and forth in translational movement along the axis 30, relative to the guide rail 54. This translational movement along axis 30 is indicated in FIG. 3 by the arrows 62.

For an interaction of the guide rail 54 with the chassis 14, FIG. 3 indicates that the guide rail 54 is pivotally mounted on the chassis 14 for rotation around a pivot point 64. Further, FIG. 3 shows that a tilting screw-drive 66 is positioned for engagement between the chassis 14 and the guide rail 54 at a connecting point 68. The functional purpose for tilting screw-drive 66 is actually two-fold. For one, in combination with the attachment between guide rail 54 and chassis 14 at the pivot point 64, the tilting screw-drive 66 connected at connecting point 68 on the guide rail 54 helps stabilize the guide rail 54 with hitching bar 28 on the chassis 14. For another, the tilting screw-drive 66 can be selectively actuated to rotate the guide rail 54 and the hitching bar 28 together around the pivot point 64.

With reference to FIG. 4 it will be seen that along with the tilting screw-drive 66, a lifting screw-drive 72 is included with the apparatus 10. Although only one lifting screw-drive 72 is shown in FIG. 4, it is to be appreciated there are a pair of lifting screw-drives 72 that straddle the guide rail 54. In detail, a first end 74 of each lifting screw-drive 72 is fixed on respectively opposite sides of the guide rail 54. Similarly, a second end 76 of each lifting screw-drive 72 is positioned to urge against the push plate 52 that is directly connected with the connector 50 of the hitching bar 28 (see FIG. 2). Thus, as perhaps best appreciated with reference to FIG. 4, the lifting screw-drives 72 can be activated to move the hitching bar 28 in translation (arrows 62) on the guide rail 54. In a separate operation, the tilting screw-drive 66 can be activated to move the guide rail 54 and hitching bar 28, together, in rotation (see arrows 70) on the chassis 14 around the pivot point 64.

An operation of the apparatus 10 will be best appreciated with reference back to FIG. 1. There it will be seen that the foot 38 of hitching bar 28 is first positioned under a heavy object that is to be moved (e.g. tank 12). A belt 78 is then cinched around the tank 12 to hold it against the cradle 48. If needed, the buckle 36 can be engaged with the top of the tank 12 to help secure and stabilize the tank 12 on the hitching bar 28.

With the tank 12 secured on the hitching bar 28, and with tank 12 in a vertical orientation, a toggle switch 80 on the control panel 18 can be exercised to activate the lifting screw-drives 72. Thus, tank 12 can be lifted/lowered as needed. Next, a toggle switch 80 on the control panel 18 can be exercised to activate the tilting screw-drive 66. Specifically, this is done to position the bulk of tank 12 over the chassis 14 during transport. Finally, a power switch 82 on the control panel 18 can be exercised to activate the drive wheels 20 and thereby transport the tank 12. Directional control of the apparatus 10 is provided by manipulating the control bar 16.

While the particular Tank Lifter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An apparatus for lifting and tilting an elongated, cylindrical-shaped tank relative to a vertical orientation, wherein the tank defines a longitudinal axis and the apparatus comprises:
   a chassis;
   an elongated guide rail mounted on the chassis for rotation thereon about a pivot point;
   an elongated hitching bar defining an axis and having an upper end and a lower end, wherein the hitching bar is positioned on the guide rail for translational movements thereon in directions back and forth along the axis of the hitching bar, and for rotational movements of the hitching bar with the guide rail around the pivot point on the chassis;
   a foot affixed to the lower end of the hitching bar to extend perpendicularly from the axis thereof to support the tank when the tank rests against the foot;
   a cradle formed on the hitching bar between the upper and lower ends thereof to support the tank in a predetermined orientation relative to the axis of the hitching bar;
   a means for lifting and lowering the tank in translational movements on the guide rail when the tank is hitched onto the hitching bar; and
   a means for tilting the guide rail around the pivot point on the chassis when the tank is hitched onto the hitching bar, to facilitate moving the tank.

2. The apparatus of claim 1 wherein the lifting means comprises a pair of lifting screw-drives, wherein the lifting screw-drives straddle the hitching bar and each lifting screw-drive has a first end and a second end with the respective first end fixedly mounted on the guide rail and the respective second end engaged with the hitching bar.

3. The apparatus of claim 2 wherein the tilting means comprises a tilting screw-drive having a first end and a second end, wherein the first end of the tilting screw-drive is pivotally mounted on the chassis and the second end thereof is pivotally mounted on the guide rail at a location between the pivot point and the upper end of the hitching bar.

4. The apparatus of claim 3 further including a carriage for supporting the chassis during movements of the apparatus, and wherein the carriage comprises:
   a pair of front casters;
   a pair of rear casters; and
   a pair of drive wheels positioned between the front and rear pairs of casters with each drive wheel respectively aligned between a front caster and a rear caster to support the carriage.

5. The apparatus of claim 4 further including a control panel which comprises:
   a lifting toggle switch electrically connected to the lifting screw-drives for operating the lifting screw-drives;
   a tilting toggle switch electrically connected to the tilting screw-drive for operating the tilting screw-drive;
   a power switch electrically connecting to the drive wheels for operating the drive wheels; and
   a motor for powering the lifting screw-drives, the tilting screw-drive and the drive wheels.

6. The apparatus of claim 1 further comprising:
   a buckle attached to the upper end of the hitching bar for engagement with the tank; and
   a belt connected with the cradle and strapped over the tank to help secure and stabilize the tank against the hitching bar.

7. The apparatus of claim 6 further comprising a locking pin engaged with the hitching bar to establish a distance L between the buckle at the upper end of the hitching bar and the foot at the lower end of the hitching bar.

8. The apparatus of claim 1 wherein the axis of the tank is oriented parallel to the axis of the hitching bar when the tank is hitched onto the hitching bar.

9. The apparatus of claim 1 wherein the tilting means rotates the tank from a vertical orientation back and forth through an angle $\alpha$, wherein the angle $\alpha$ is in a range between 0° and 50°.

10. An apparatus for lifting and tilting an elongated, cylindrical-shaped tank relative to a vertical orientation, wherein the tank defines a longitudinal axis and the apparatus comprises:
    a chassis;
    an elongated guide rail mounted on the chassis for rotation thereon about a pivot point;
    a hitching assembly positioned on the guide rail for holding the tank on the guide rail;
    a means for lifting and lowering the hitching assembly in translational movements on the guide rail when the tank is hitched onto the hitching assembly; and
    a means for tilting the guide rail around a pivot point on the chassis when the tank is hitched onto the hitching assembly.

11. The apparatus of claim 10 wherein the hitching assembly comprises:
    an elongated hitching bar defining an axis and having an upper end and a lower end, wherein the hitching bar is positioned on the guide rail for translational movements thereon in directions back and forth along the axis of the hitching bar, and for rotational movements of the hitching bar with the guide rail through an angle $\alpha$ around a pivot point on the chassis;
    a foot affixed to the lower end of the hitching bar to extend perpendicularly from the axis thereof to support the tank when the tank rests against the foot; and
    a cradle formed on the hitching bar between the upper and lower ends thereof to support the tank in a predetermined orientation relative to the axis of the hitching bar.

12. The apparatus of claim 11 wherein the lifting means comprises a pair of lifting screw-drives, wherein the lifting screw-drives straddle the hitching bar and wherein each lifting screw-drive has a first end and a second end with the respective first end fixedly mounted on the guide rail and the respective second end engaged with the hitching bar.

13. The apparatus of claim 12 wherein the tilting means comprises a tilting screw-drive having a first end and a second end, wherein the first end of the tilting screw-drive is pivotally mounted on the chassis and the second end thereof is pivotally mounted on the guide rail at a location between the pivot point and the upper end of the hitching bar.

14. The apparatus of claim 13 further including a carriage for supporting the chassis during movements of the apparatus, and wherein the carriage comprises:
    a pair of front casters;
    a pair of rear casters; and a pair of drive wheels positioned between the front and rear pairs of casters with each drive wheel respectively aligned between a front caster and a rear caster to support the carriage.

15. The apparatus of claim 14 further including a control panel which comprises:
   a lifting toggle switch electrically connected to the lifting screw-drives for operating the lifting screw-drives;
   a tilting toggle switch electrically connected to the tilting screw-drive for operating the tilting screw-drive;
   a power switch electrically connecting to the drive wheels for operating the drive wheels; and
   a motor for powering the lifting screw-drives, the tilting screw-drive and the drive wheels.

16. The apparatus of claim 11 further comprising:
   a buckle attached to the upper end of the hitching bar for engagement with the tank;
   a belt connected with the cradle and strapped over the tank to help secure and stabilize the tank against the hitching bar; and
   a locking pin engaged with the hitching bar to establish a distance L between the buckle at the upper end of the hitching bar and the foot at the lower end of the hitching bar.

17. The apparatus of claim 10 wherein the tilting means rotates the tank from a vertical orientation back and forth through an angle $\alpha$, wherein the angle $\alpha$ is in a range between 0° and 50°.

18. A method for assembling an apparatus for lifting and tilting an elongated, cylindrical-shaped tank relative to a vertical orientation, wherein the tank defines a longitudinal axis and the method comprises the steps of:
   providing a hitching assembly, wherein the hitching assembly includes a hitching bar defining an axis and having an upper end and a lower end;
   positioning the hitching bar on a guide rail for translational movements thereon in directions back and forth along the axis of the hitching bar;
   mounting the guide rail on a chassis for rotational movements of the hitching bar on the guide rail through an angle $\alpha$ around a pivot point on the chassis;
   engaging a pair of lifting screw-drives between the guide rail and the hitching assembly, wherein the lifting screw-drives straddle the hitching bar and each lifting screw-drive has one end fixedly mounted on the guide rail and an opposite end engaged with the hitching bar for moving the hitching bar on the guide rail;
   engaging a tilting screw-drive between the guide rail and the chassis, wherein one end of the tilting screw-drive is pivotally mounted on the chassis and an opposite end thereof is pivotally mounted on the guide rail at a location between the pivot point and the upper end of the hitching bar; and
   respectively activating the lifting and tilting screw-drives to selectively move the hitching bar in translation on the guide rail, and to move the hitching bar with the guide rail in rotation around the pivot point on the chassis.

19. The method of claim 18 further comprising the step of providing a carriage for supporting the chassis, and wherein the carriage comprises:
   a pair of front casters;
   a pair of rear casters; and
   a pair of drive wheels positioned between the front and rear pairs of casters with each drive wheel respectively aligned between a front caster and a rear caster to support the carriage.

20. The method of claim 18 further comprising the step of operating a control panel by selectively moving a lifting toggle switch on the control panel to activate the lifting screw-drives, moving a tilting toggle switch on the control panel to activate the tilting screw-drive, and moving a power switch on the control panel to activate the drive wheels.

\* \* \* \* \*